Figure 1:
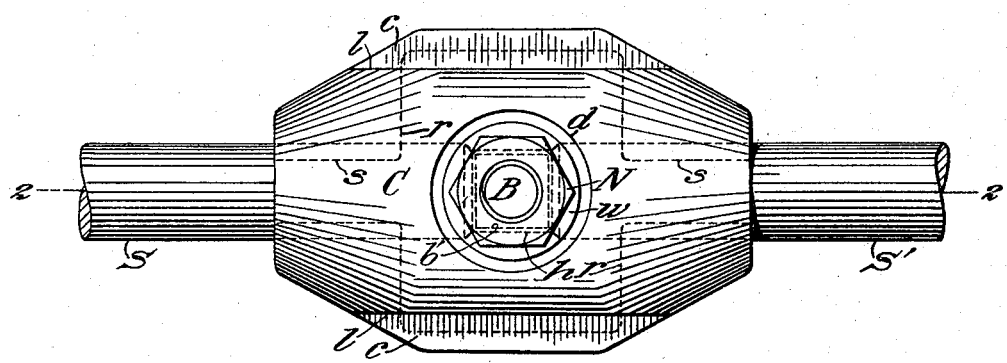

E. C. LEWIS.
SHAFT COUPLING.
APPLICATION FILED MAR. 3, 1916.

1,217,465.

Patented Feb. 27, 1917.

INVENTOR
Everett C. Lewis
BY
Foster Freeman Watson Hart
ATTORNEYS

UNITED STATES PATENT OFFICE.

EVERETT C. LEWIS, OF CRANSTON, RHODE ISLAND, ASSIGNOR, BY MESNE ASSIGNMENTS, TO UNIVERSAL WINDING COMPANY, OF BOSTON, MASSACHUSETTS, A CORPORATION OF MASSACHUSETTS.

SHAFT-COUPLING.

1,217,465.     Specification of Letters Patent.     Patented Feb. 27, 1917.

Application filed March 3, 1916. Serial No. 81,933.

*To all whom it may concern:*

Be it known that I, EVERETT C. LEWIS, a citizen of the United States, residing at Cranston, in the county of Providence, State of Rhode Island, have invented certain new and useful Improvements in Shaft-Couplings, of which the following is a specification.

My invention is an improved shaft-coupling for connecting the ends of two rotating shafts. The object of my improvement is to provide a simple and efficient device for this purpose adapted to be clamped to the shafts by means of a single bolt and acting to connect the shafts rotatively without chance of slippage or lost motion. A particular object of the invention is to cheapen the cost of construction of the device and to provide for its easy application, while also guarding against its accidental displacement or removal.

The manner and means for carrying out the improvement are fully described in the following specification, illustrated by the accompanying drawings, in which like reference characters designate like parts. In the drawings:—

Figure 2:
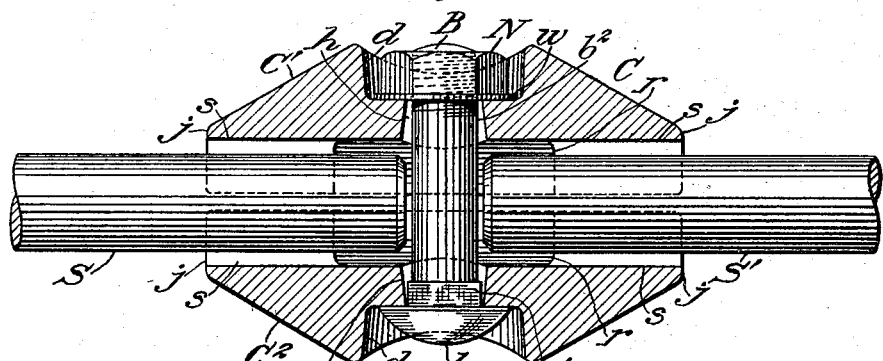
Figure 3:
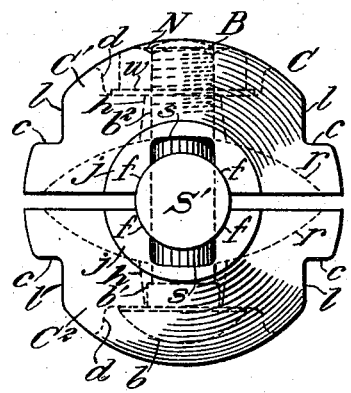

Figure 1 is a plan view of my improved coupling showing it in position on the ends of two alining shafts;

Fig. 2, a vertical, sectional view of the same, taken on the line 2—2 of Fig. 1;

Fig. 3, an end view of the device.

In the drawings, S, S' designate portions of two axially-alining shafts arranged with their ends closely adjacent and adapted to be driven one from the other. My improved coupling C comprises essentially a two-part sleeve consisting of the opposite, hollow blocks or clamp-members C', $C^2$ fitted to inclose the ends of the shafts S, S'. Preferably both members C', $C^2$ are of the same form and construction, to adapt them to be cast from one pattern, and are tapered inwardly at their ends to lighten the structure, while providing enlargements at the center to reinforce them at this point. The opposite, longitudinal sides of the members C', $C^2$ are also cut away at $c$, $c$ to further reduce their weight, as shown more particularly in Fig. 3, and to provide the ledges or shoulders 1, 1 by which the castings may be grasped in a vise for machining and finishing.

At their centers the members C', $C^2$ are hollowed out or concaved with curved recesses $r$, $r$ extending nearly to their sides as shown by the dotted lines in Figs. 1 and 3; while at their ends are opposed jaws $j$, $j$ fitted to the diameter of the shafts to which the coupling is to be applied. Each jaw $j$ is preferably cut through longitudinally with a slot $s$ which divides its engaging face into two separate parts $f$, $f$ as shown most clearly in Fig. 3. This construction provides for the jaws of the clamp-members taking a firmer grip or bite on the shafts S, S', as more fully explained hereinafter.

At their centers the members C', $C^2$ are formed with counterbores $d$, $d$ from which radially-disposed square-holes $h$, $h$ lead into their central recesses. The counterbores $d$, $d$ serve as sockets for the end-head $b$ and nut N of the clamping-bolt B which extends through the radial holes $h$, $h$ between the adjacent ends of the shafts S, S'. Preferably the bolt B is of the usual "coach" type having a mushroom head $b$ under which is a square shoulder-portion $b'$, while the shank $b^2$ is cylindrical in cross-section and threaded at its end. The nut N is screwed onto the threaded end of the bolt B and set up against a washer $w$ to draw the parts of the coupling together and clamp them against the ends of the shafts S, S'. The squared portion $b'$ of the bolt B fits the square hole $h$ in the member $C^2$ to hold it from turning therein and the counterbores $d$, $d$ receive the head and nut of the bolt to prevent them from projecting from the sides of the coupling. It will thus be seen that the outside of the coupling presents a smooth surface with no projecting parts to catch in the clothing or injure the hands of a person when the shafts are rotating at high speed.

In applying the coupling to use its two halves C', $C^2$ are fitted around the ends of the alining shafts S, S' and the bolt B inserted through their holes $h$, $h$, after which the washer $w$ and nut N are applied. As the nut N is screwed down on the bolt B the two members C', $C^2$ will be drawn together to bind their jaws $j$, $j$ tightly against the peripheries of the shafts to secure the latter together rotatively. Through the peculiar arrangement of the jaws *j* and the bolt B I secure, in effect, a three-point bearing for each clamp-member so that the whole coupling is virtually automatically-adjustable for self-conforming. As shown in Fig. 2 there is a slight clearance between the bolt B and the holes *h, h* to allow the two members $C'$, $C^2$ to rock to a limited extent to adapt their jaw-ends to seat firmly on each shaft S, S', and when the nut N is tightened against the washer *w* an equal pressure is exerted at both ends. In other words, the coupling-members aline themselves on the peripheries of the shafts to secure a firm, positive bearing against each. The dividing of the jaws *j*, as previously explained, provides for a clearance at their centers so that the two parts will act with a wedging effect on the circumferences of the shafts to secure a firm grip or bite.

Heretofore, in shaft-couplings designed for the purpose above described, it has been the usual practice to employ several bolts to draw the parts together and clamp them in place. In my present improvement I not only simplify the construction by employing a single clamping-bolt, but, as before explained, I secure the three-point bearings which provide the self-alining feature, besides effecting a more positive and secure grip between the parts. Even though the shafts are slightly out of alinement or out of true on their surfaces the coupling may be set up against their ends to bring them into place and overcome any irregularities as to form or size. In this way my improved coupling is rendered universally adaptable for general application and is more efficient for the purpose intended than similar devices now in use. Moreover, the form and arrangement of the parts of the coupling provide for economical manufacture, while also eliminating superfluous nuts and bolts and giving an extremely neat and compact appearance to the whole device. Through the improved design as shown I also eliminate all projecting parts such as nuts and bolt ends, thus rendering the coupling safer for use at high speeds and in dangerous localities.

Various slight modifications might be made in the form and construction of the parts of my improved device without departing from the spirit or scope of the invention; therefore, without limiting myself to the exact embodiment shown and described, what I claim is:—

1. In a shaft-coupling, the combination of a two-part sleeve comprising opposite members formed at their ends with circumferentially-spaced radially-projecting jaws adapted to bind against the peripheries of two alining shafts, and a bolt extending through the center of the sleeves between the ends of the shafts to clamp the jaws of the two members against the shafts in frictional engagement therewith.

2. In a shaft-coupling, the combination of a two-part sleeve comprising opposite members having their central portions chambered out on the interior and formed with circumferentially-spaced inwardly-projecting jaw-sections at their ends fitted to receive the peripheries of two alining shafts, and a bolt extending through the centers of the members between the ends of the shafts to draw the parts of the sleeve together to clamp the jaws against the shafts with a wedging action to cause a frictional grip thereon.

3. An improved shaft-coupling comprising a two-part sleeve consisting of opposite halves enlarged at the center and tapered toward the ends, with their central portions hollowed out on the interior of the sleeve and provided with opposite diametrically-arranged holes, and a bolt extending through the holes to clamp the parts of the sleeve together, said sleeve having jaws at its ends for receiving the ends of two alining shafts to connect them to rotate together.

In testimony whereof I affix my signature.

EVERETT C. LEWIS.

Copies of this patent may be obtained for five cents each, by addressing the "Commissioner of Patents, Washington, D. C."